United States Patent [19]

Van Pool

[11] 4,155,877

[45] May 22, 1979

[54] CATALYST COMBUSTION REGENERATION PROCESS IN DOWNWARDLY MOVING BED WITH ADDITIONAL OUTLET RESPONSIVE TO GAS FLOWS

[75] Inventor: Joe Van Pool, Bartlesville, Okla.

[73] Assignee: Phillips Petroleum Company, Bartlesville, Okla.

[21] Appl. No.: 888,809

[22] Filed: Mar. 21, 1978

[51] Int. Cl.$^2$ .................. B01J 21/20; B01J 29/38; C10G 13/16

[52] U.S. Cl. .................. 252/418; 208/165; 208/168; 208/174; 422/144

[58] Field of Search ......... 252/418; 23/288 B, 288 G; 208/165, 168, 174, 113

[56] References Cited

U.S. PATENT DOCUMENTS

| | | | |
|---|---|---|---|
| 2,418,679 | 4/1947 | Utterback | 208/165 |
| 2,561,408 | 7/1951 | Peavy | 252/418 |
| 2,566,731 | 9/1951 | Komlime | 110/8 |
| 2,684,927 | 7/1954 | Bergstrom | 208/174 |
| 2,716,091 | 8/1955 | Ray | 252/418 |
| 2,753,295 | 7/1956 | Ramella | 208/174 |
| 2,835,629 | 5/1958 | Berg | 252/418 |
| 2,846,367 | 8/1958 | Lifland | 23/288 G |
| 2,941,955 | 6/1960 | Moulthrop | 252/418 |
| 3,005,772 | 10/1961 | Berstrom et al. | 208/173 |
| 3,223,650 | 12/1965 | Van Pool | 252/418 |
| 3,925,258 | 3/1973 | Cox | 252/416 |

*Primary Examiner*—Patrick Garvin
*Assistant Examiner*—P. E. Konopka

[57] ABSTRACT

Catalyst regeneration process and apparatus wherein air introduced to a midsection of a downwardly-moving mass of catalyst particles is taken off at the top and at the bottom of said bed through provided outlets and a third outlet is provided at the bottom portion of the said bed adapted to be controlled responsive to change in the flows through the top outlet and first mentioned bottom outlet to maintain substantially constant the total upward and downward flows through said bed. In an embodiment in which coke laydown on a hydrocarbon treated catalyst is burned off flue gases flow upwardly and out from the bed, e.g., through a carbon monoxide or flue gas burning boiler while downwardly flowing flue gas is taken off through a pressure control outlet or opening on which suction is taken by a blower passing flue gases to a boiler, a third outlet also flow controlled is operated responsive to change in the desired upward and downward flows of the flue gases. The third outlet, in operation of the regeneration system, can be normally closed or partly opened so that a condition of no flow or some flow, respectively, can exist.

9 Claims, 1 Drawing Figure

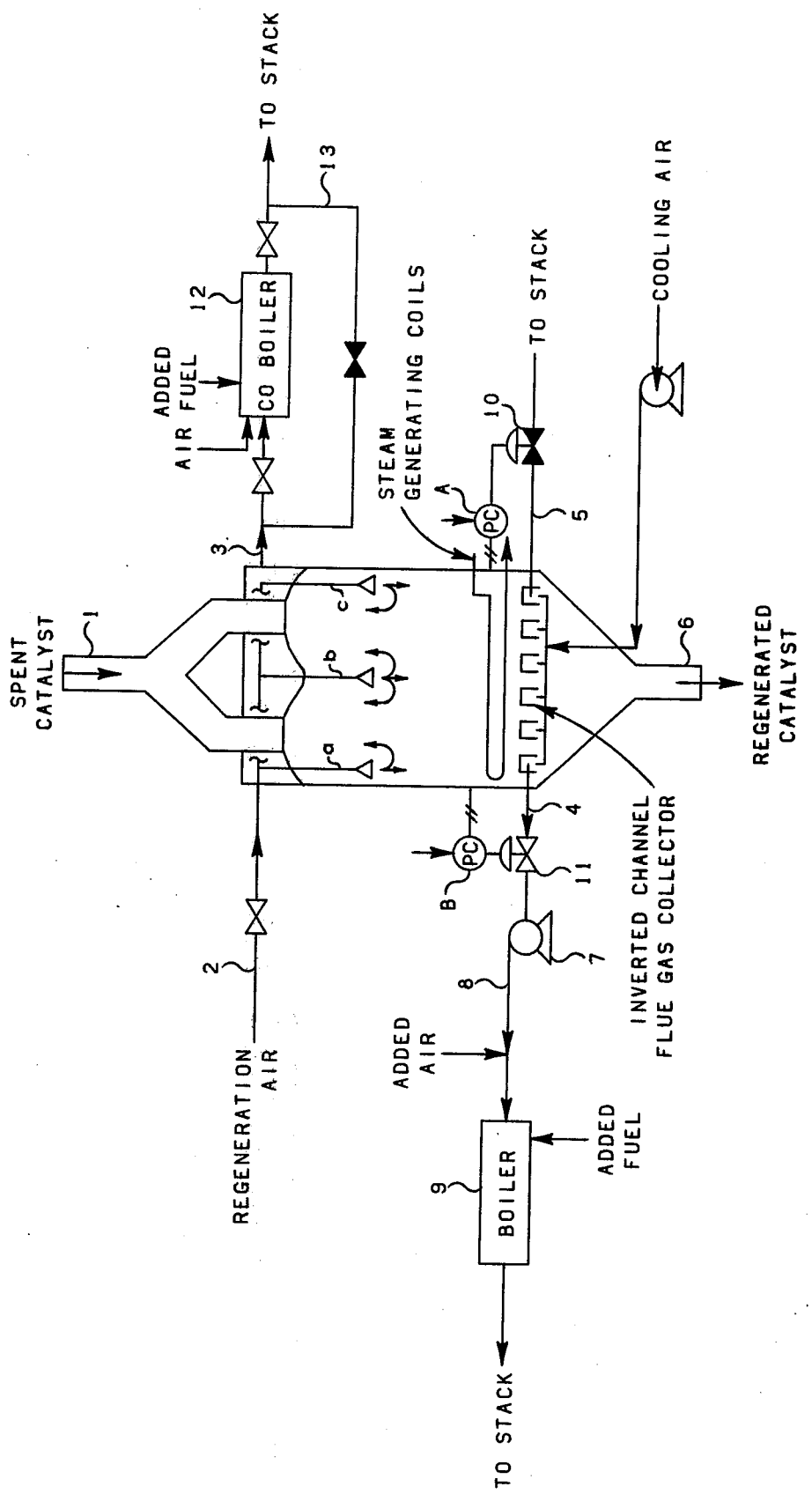

CATALYST COMBUSTION REGENERATION PROCESS IN DOWNWARDLY MOVING BED WITH ADDITIONAL OUTLET RESPONSIVE TO GAS FLOWS

This invention relates to the regeneration of a catalyst. In one of its aspects the invention relates to the regeneration of a spent hydrocarbon treating, e.g., cracking catalyst. More specifically, the invention relates to the controlled regeneration of a hydrocarbon cracking catalyst having a coke laydown thereon to cause combustion of most coke in controlled manner with consequent regeneration of the catalyst for reuse. Further, specifically, the invention relates to a method, and to apparatus, for regenerating a downwardly be closed moving bed constituted by a mass of spent catalyst particles.

In one of its concepts the invention provides a method and apparatus, wherein a downwardly moving bed constituted by a mass of spent catalyst particles is regenerated with a regeneration gas or air which is supplied to a midsection of the bed, there is a top outlet and a bottom outlet for spent regeneration gas, e.g., flue gas and there is a third outlet at the bottom portion of the bed for removing flue gas therefrom the flow through said last mentioned outlet being controlled responsive to change in desired upward and downward flow of air and/or flue gas in said bed. In another of its concepts the invention provides a method, and apparatus, wherein the third outlet is on a flow control, flow being controlled responsive to a change in condition in the regeneration system, e.g., an increase in pressure at the bottom portion of the bed. In a still further concept the invention provides opening of the flow control on the third outlet when an undesired condition in the regeneration system is sensed. In a still further and specific concept the invention provides for maintaining some flow through said third outlet at all times and governing the rate of flow through said outlet responsive to a change in conditions within the regeneration system.

U.S. Pat. No. 2,684,927 issued July 27, 1954, E. V. Bergstron, relates to the kind of process and apparatus to which this invention, generally, is applicable. The disclosure of the patent is incorporated herein by reference for sake of brevity. The operations from which spent catalyst is obtained and is to be regenerated according to the present invention is set forth in the patent as well as details of an embodiment of apparatus generally used in the art for regenerating a downwardly moving mass or bed of catalyst particles. Other patents which are related to the field to which this invention lies or to which it is applicable, the disclosures of which are accordingly incorporated by reference are U.S. Pat. Nos. 2,418,679 in Apr. 8, 1947, E. Utterback; 2,561,408 issued July 24, 1951 C. C. Peavy; 2,716,091 issued Aug. 23, 1955, F. E. Ray and 2,753,295 issued July 3, 1956, A. Ramella.

Energy costs have been considerably increased and are still increasing. Catalysts undergoing regeneration, e.g., used hydrocarbon conversion catalysts having coke laydown thereon are usually regenerated employing oxygen or an oxygen containing gas, e.g., air, to cause combustion of the "coke laydown." This generates a large amount of flue gas or gas resulting from combustion of the coke. Such flue gas is not only obtained at a elevated temperature but it contains constituents, e.g., carbon monoxide which can be combusted alone or preferably with additional fuel as in a boiler to produce steam. Thus, it is possible to take off as from the top and/or the bottom of a bed of catalyst undergoing regeneration as described herein, flue gas which is useful in producing energy. A flue gas taken off from the top of a bed undergoing regeneration can contain, say, 5 or more percent of carbon monoxide and about, say, 5 percent of oxygen. A flue gas taken off the bottom of a bed undergoing regeneration may contain a fairly large quantity of oxygen in the neighborhood of about 15 percent and approaching about 1 percent of carbon monoxide, the percentages given being by volume. It will be seen that such gases which are available and which contain heat and heat producing constituents can be combusted in a boiler to produce steam, useful in the overall hydrocarbon treating or conversion processes extant at the place at which the catalyst is being regenerated.

In one operation the flue gas taken off from the upper portion of the bed resulting from flow upwardly from a midsection thereof and generated in the upper portion of the bed where the greater part combustion of the coke laydown takes place is simply taken off and together with added fuel and air, passed to a so-called CO boiler and there burned to produce heat. At times the CO boiler may have to be shut down and consequently the flue gas taken off from the top of the bed undergoing regeneration will have to be bypassed around this boiler.

The flue gas taken off the bottom of the bed undergoing regeneration is generated in that part of the regeneration zone or vessel in which a lesser portion of coke laydown is being burned or combusted from the catalyst particles. Nevertheless, this flue gas contains heat and heat producing constituents and can be fed to a steam boiler together with added fuel and air. At times for some reason the boiler and/or a blower feeding the flue gas from the bottom section of the bed to the boiler may be shut down or some failure in the operation of the blower may occur.

Whether there is bypassing of the so-called CO boiler or whether for some reason flue gas is not suitably being removed from the bottom of the bed it will seen that conditions in the bed will be disturbed. It is essential at all times to maintain desired regeneration conditions on the moving bed of catalyst which, of course, is constantly being withdrawn from the regeneration system and passed to a hydrocarbon treating operation.

It has now occurred to me to provide a third flue gas removal preferably at the bottom portion of the bed undergoing regeneration. Such outlet is one flow control responsive to change in condition in the regeneration operation. For example, if the CO boiler is being bypassed and there is a sudden dropping of pressure at the top of the bed, tending to cause more regeneration gas to pass upwardly through the top part of the bed, the third outlet is opened or further opened if it is already open to cause more flue gas to be taken from the bottom of the bed thus to maintain the relative proportions of upward and downward flows. Likewise, in the event the blower taking the suction from the bottom of the bed should for some reason shut down or be shut down the third outlet again will be brought into play by being opened or further opened.

In a specific form of apparatus there is provided on the third outlet on the bottom of the regeneration zone or vessel a flow control valve on pressure control the set point of which is adjusted to maintain by opening the valve on said third outlet or opening it further the desired pressure and consequent flow or proportion of flow from the bottom of the vessel.

It is an advantage of the invention that should there be fluctuation in regeneration gas or air supplied to the regeneration zone the invention will operate to maintain the relative amounts or proportions of the respective flows.

It is an object of this invention to provide a process for the regeneration of a used catalyst. It is another object of the invention to provide an apparatus for the regeneration of a spent catalyst. It is a further object of the invention to provide for a controlled regeneration of catalyst, e.g., a hydrocarbon conversion catalyst having coke laydown thereon while making use of flue gas or combustion gases generated during such regeneration. It is a further object still to provide process and apparatus wherein relative flows of regeneration gas or air passing both upwardly and downwardly through a downwardly moving mass of catalyst particles can be maintained even when for some reason take off of flue gas from the top and/or the bottom of said bed normally in a desired ratio of flows, is disturbed.

Other aspects, concepts objects and the several advantages of this invention are apparent from a study of this disclosure the drawing and the appended claims.

According to the present invention there are provided a process, and apparatus, for the regeneration of a catalyst having a coke laydown thereon wherein the coke is combusted to form a flue gas, the catalyst is a mass of particles being passed downwardly as a bed through a regeneration zone, into which regeneration air or oxygen containing gas is introduced at a midpoint and caused to pass through the bed upwardly and downwardly, controlling the flows of air or regeneration gas throughout the bed to effect desired combustion - regeneration of the catalyst at all places in said bed by providing a first flue gas outlet at the top of said bed, a second flue gas outlet at the bottom of said bed, said flue gas outlets being such as to yield a desired pressure at each to obtain said flows upwardly and downwardly through said bed, and a third outlet at the foot portion of said bed adapted to be controlled responsive to a change in at least one of said flows through said first and second outlets.

In the drawing there is shown, in simplified form, an apparatus and operation according to the invention.

Referring now to the drawing, spent catalyst moves downwardly into a regeneration vessel by 1 and is regenerated therein being removed at 6. The flow from the vessel of the mass of particles is controlled to maintain the vessels substantially full, i.e., filled with a bed of catalyst particles. Regeneration air is introduced at 2 through downcomer a, b, and c. As indicated by the arrows some of the air passed upwardly through the catalyst bed and some of the air passed downwardly therethrough. Conditions of regeneration, known in the art are maintained in the bed. The upwardly moving regeneration air will encounter catalysts having the most coke laydown thereon and there will be generated a gas containing a goodly portion of carbon monoxide. This gas is taken off at 3 and passed through a CO boiler 12 as in producing steam for use in the overall operations. Preferably the CO boiler is operated with added fuel and sufficient air to maintain acceptable combustion conditions as can be judged by emission testing.

Downwardly moving air passes through the bed and is collected in an inverted channel of flue gas collecter as known in the art and passed by 4 through pressure control valve 11 on pressure controller B and pumped by blower 7 and by 8 together with added air and fuel to boiler 9 where, again steam can be generated. It is seen that considerable heat and heat producing constituents can be thus recovered and used effectively. This results in considerable savings of energy, overall a period.

A third outlet pressure controller A at outlet 5 and equipped with valve 10 is provided according to the invention. In this embodiment the pressure controller A senses immediately any increase or decrease in pressure. If the valve is operated normally closed it will open upon increase in pressure which, in mpost cases, is the most likely occurrence. However, by operating the valve in a partially opened position it can closed to an extent or completely closed in the event of a drop in pressure.

Thus, it can be seen by one skilled in the art in possession of this disclosure having studied the same that there is provided a system of considerable flexibility for the recovery of heat values while at the same time insuring operation of the regeneration system in a desired manner thus whether the CO boiler 12 needs to be bypassed via 13 for some reason or there is some shut down or need to shut down of the blower 7 or, for that matter, for some reason regeneration air supply 2 tends to vary in rate the system of the invention will be operative to maintain, at least for a substantial time, the desired conditions of operation.

The following is a tabulation of calculated conditions given simply to illustrate the normal, desired operation of the regenerator.

| | |
|---|---|
| (1) Spent Catalyst to Kiln: | |
| Tons per hour, | 300 |
| Wt. % "coke", | 1.24 |
| Approx. Size of Catalyst, Conventional Pelleted TCC, catalyst | 3/16" to Dust |
| Temperature, °F., | 900 |
| (2) Regeneration Air to Kiln: | |
| SCF/hr., | 24,480 |
| Actual Temperature, °F., | 85 |
| Actual Pressure, inches H$_2$O | 30 |
| (3) Upper "Flue Gas" to Co Boiler | |
| SCF/hr., | 20,083 |
| Actual Temperature, °F., | 925 |
| Actual Pressure, inches H$_2$O | 12 |
| Composition, vol. %., | |
| CO   5.8 | |
| H$_2$O   8.3 | |
| CO$_2$   7.4 | |
| O$_2$   5.0 | |
| N$_2$   73.5 | |
| (4) Bottom "Flue Gas" to Blower: | |
| SCF/hr., | 13,119 |
| Actual Temperature, °F., | 955 |
| Actual Pressure, inches H$_2$O | 14 |
| Composition, vol.%., | |
| CO   0.8 | |
| H$_2$O   1.6 | |
| CO$_2$   4.7 | |
| O$_2$   14.8 | |
| N$_2$   78.1 | |
| PRC (B) setting, inches H$_2$O | 14 |
| (5) "Flue Gas" Relief: | |
| SCF/hr., | normally none |
| PRC (A) setting, inches H$_2$O | 15 |
| (6) Regenerated Catalyst from Kiln: | |
| Tons/hr., | 296.5 |
| Wt. % "coke" | 0.1 |

| -continued | |
|---|---|
| Approx. Size of Catalyst, Conventional Pelleted TCC Catalyst | 3/16" to Dust |
| Temperature, °F., | 1042 |
| Kiln Conditions: | |
| Top Section: | |
| Pressure, inches H₂O | 12 |
| Temperature, °F., | 915 |
| Mid (Air Injection) Section: | |
| Pressure, inches H₂O | 30 |
| Temperature, °F., | 1100 |
| Bottom Section: | |
| Pressure, inches H₂O | 14 |
| Temperature, °F., | 955 |

Reasonable variation and modification are possible within the scope of the foregoing disclosure, drawing and the appended claims to the invention the essence of which is that there have been provided process and apparatus applicable to the regeneration of a spent catalyst, e.g., a hydrocarbon catalyst, having coke laydown thereon with a recovery of heat values yet to operate safely and efficiently by providing in a regeneration operation or apparatus in which there is a downwardly moving bed of a mass of catalyst particles undergoing regeneration and into which there is injected at a midpoint regeneration air or gas creating an upward flow and a downward flow and corresponding take-offs to remove flue gas thus generated an additional control take-off flow through which is controlled responsive to detected change in a desired condition or flow rate or pressure, etc., in the regeneration system.

I claim:

1. A process for the regeneration of a catalyst having a coke or carbonaceous laydown thereon wherein the coke is combusted to form a flue gas, the catalyst is a mass of particles being passed downwardly as a bed through a regeneration zone or vessel, into which regeneration air or oxygen containing gases are introduced to a midpoint and caused to permeate and to pass through the bed upwardly and downwardly, controlling the flows of air or regeneration gas throughout the bed to effect desired combustion-regeneration of the catalyst at all places in said bed by providing a first flue gas outlet at top of said bed, a second flue gas outlet at the bottom of said bed, said flue gas outlets being operated so as to yield a desired pressure at each to obtain said flows upwardly and downwardly and a third outlet at the foot portion of said bed adapted to be controlled responsive to change in pressure in the bottom of said bed to maintain said flows throughout said bed at predetermined constant values.

2. A process according to claim 1 wherein said third outlet is normally operated to be in closed condition and opens responsive to change in the flows through said first and second outlets.

3. A process according to claim 1 wherein said third outlet is operated normally partly opened and the degree of opening is adjusted responsive to a change in the flows through said first and second outlets.

4. A process according to claim 1 wherein the third outlet is operated normally closed, is on pressure control, and is opened whenever an increase in pressure in the bottom of said bed is detected.

5. A process accoording to claim 1 wherein the flue gas from the outlet at the top of said bed is passed to a boiler, the flue gas from the bottom of said bed in normal operation is passed to a blower and then to a place of utilization as in a boiler and wherein said third outlet is in normally closed condition and is opened responsive to pressure whenever said blower ceases to operate as it does normally.

6. A process for the regeneration of a catalyst having a coke or carbonaceous laydown thereon wherein the coke is combusted to form a flue gas, the catalyst is a mass of particles being passed downwardly as a bed through a regeneration zone or vessel, into which regeneration air or oxygen containing gases are introduced to a midpoint and caused to permeate and to pass through the bed upwardly and downwardly, controlling the flows of air or regeneration of the catalyst at all places in said bed by providing a first flue gas outlet at top of said bed, a second flue gas outlet at the bottom of said bed, said flue gas outlets being operated so as to yield a desired pressure at each to obtain said flows upwardly and downwardly and a third outlet at the foot portion of said bed adapted to be controlled responsive to increase in pressure at the foot portion of said bed, the third outlet is normally closed and is opened whenever an increase in pressure in the bottom of said bed will prevent efficient regeneration air or oxygen to pass through the bottom portion of said bed thus to prevent incomplete regeneration of catalyst in the bottom portion of said bed undue heating of catalyst in the upper portion of said bed which may destroy said catalyst in said upper portion of said bed.

7. A process for the regeneration of a catalyst having a coke or carbonaceous laydown thereon wherein the coke is combusted to form a flue gas, the catalyst is a mass of particles being passed downwardly as a bed through a regeneration zone or vessel, into which regeneration air or oxygen containing gases are introduced to a midpoint and caused to permeate and to pass through the bed upwardly and downwardly, controlling the flows of air or regeneration of the catalyst at all places in said bed by providing a first flue gas outlet at top of said bed, a second flue gas outlet at the bottom of said bed, said flue gas outlets being operated so as to yield a desired pressure at each to obtain said flows upwardly and downwardly and a third outlet at the foot portion of said bed, said third outlet is operated normally partly opened and the degree of opening is adjusted responsive to an increase in pressure in said bottom portion of said bed whereby insufficient flow or regeneration air or oxygen through the bottom portion of said bed is avoided with consequent avoidance of insufficiently regenerated catalyst leaving a regenerator and entering the place of utilization of said regenerated catalyst and also avoiding undue overheating of the catalyst due to excessive flow of oxygen or air in the upper portion of said bed.

8. A process for the regeneration of a catalyst having a coke or carbonaceous laydown thereon wherein the coke is combusted to form a flue gas, the catalyst is a mass of particles being passed downwardly as a bed through a regeneration zone or vessel, into which regeneration air or oxygen containing gases are introduced to a midpoint and caused to permeate and to pass through the bed upwardly and downwardly, controlling the flows of air or regeneration of the catalyst at all places in said bed by providing a first flue gas outlet at top of said bed, a second flue gas outlet at the bottom of said bed, said flue gas outlets being operated so as to yield a desired pressure at each to obtain said flows upwardly and downwardly and a third outlet at the foot portion of said bed, flue gas from said first flue gas outlet at the top of said bed being passed to a boiler wherein it is utilized to provide heat, flue gas from said second flue gas outlet from the bottom of said bed being passed to a blower and then to a boiler, said third outlet is operated normally closed and is opened responsive to an increase in pressure in the bottom portion of said bed which would prevent a sufficient regeneration of catalyst therein and would cause undesired upward flow of regeneration air or oxygen thus causing undesired overheating of the catalyst in the upper portion of said bed, as when said blower ceases to operate as desired normally.

9. A process for the regeneration of a catalyst having a coke or carbonaceous laydown thereon wherein the coke is combusted to form a flue gas, the catalyst is a mass of particles being passed downwardly as a bed through a regeneration zone or vessel, into which regeneration air or oxygen containing gases are introduced to a midpoint at which the highest pressure in said zone or vessel is prevailing and thus is caused to permeate and to pass through the bed upwardly and downwardly, controlling the flows or air or regeneration of the catalyst at all places in said bed by providing a first flue gas outlet at top of said bed, a second flue gas outlet at the bottom of said bed, said flue gas outlets being operated so as to yield a desired pressure at each to obtain said flows upwardly and downwardly and a third outlet at the foot portion of said bed adapted to be controlled responsive to change in pressure in the bottom of said bed to maintain said flows throughout said bed at predetermined constant values.

* * * * *